United States Patent [19]

Crucq et al.

[11] Patent Number: 4,769,582
[45] Date of Patent: Sep. 6, 1988

[54] LOW VIBRATION PULSE DRIVE DEVICE FOR AN ELECTRIC MOTOR

[75] Inventors: Jacobus Crucq; Andreas C. Van Veghel, both of Eindhoven, Netherlands

[73] Assignee: U.S. Philips Corporation, New York, N.Y.

[21] Appl. No.: 205,552

[22] Filed: Nov. 10, 1980

[30] Foreign Application Priority Data

Nov. 12, 1979 [NL] Netherlands ............... 7908245

[51] Int. Cl.$^4$ .............................. H02P 7/26
[52] U.S. Cl. ............... 318/345 C; 318/345 F; 318/460
[58] Field of Search ............ 318/460, 345 F, 345 G, 318/345 C, 345 R, 778, 278, 447, 452, 484, 487, 58, 385, 391; 307/141, 141.4, 141.8; 328/34, 35, 36, 53, 55

[56] References Cited

U.S. PATENT DOCUMENTS

| | | | |
|---|---|---|---|
| 2,273,988 | 2/1942 | Pinto | 307/141 X |
| 3,193,711 | 7/1965 | Westem | 307/141 |
| 3,614,543 | 10/1971 | Dick | 307/141.4 X |
| 3,678,335 | 7/1972 | Pucher | 307/141.8 X |
| 3,764,822 | 10/1973 | Ebbinge et al. | 307/141 |
| 4,101,811 | 7/1978 | Dandrel et al. | 307/141 X |
| 4,235,309 | 11/1980 | Kuhl | 318/742 |
| 4,321,447 | 3/1982 | Lamb | 307/141.4 X |
| 4,324,486 | 4/1982 | Nishikawa | 307/141.4 X |

Primary Examiner—Ulysses Weldon
Attorney, Agent, or Firm—Thomas A. Briody; David R. Treacy; Bernard Franzblau

[57] ABSTRACT

A pulse-drive circuit for an electric motor in which the steep edges in the drive-signal are made to vary substantially stepwise, i.e. around a first time instant the signal changes from a first level to a second level and around a second instant the signal changes to a third level. This makes it possible to reduce a mechanical resonance vibration having a period of twice the time interval between the two instants.

18 Claims, 4 Drawing Sheets

LOW VIBRATION PULSE DRIVE DEVICE FOR AN ELECTRIC MOTOR

The invention relates to a device for the pulsed drive of an electric motor.

Figure 1:
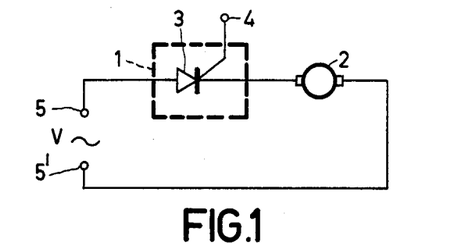
FIG. 1 represents the known device.

Such a device is known from U.S. Pat. No. 3,764,822. FIG. 1 of said patent shows an electric motor which is energized by applying a supply voltage in the form of an alternating voltage to a series connection of the motor and said device, which device is constituted by a thyristor. Said thyristor is turned on by applying a trigger pulse to its gate at a specific instant during every positive half-cycle of the supply voltage. At that instant the drive signal assumes the value of the supply voltage within a very short time and remains equal to the supply voltage until the thyristor is turned off upon the next zero passage of the supply voltage. The motor is driven pulse-wise, the drive pulses having steep leading edges and trailing edges which gradually become zero.

In this respect it is to be noted that the invention is not limited to pulses as mentioned in the foregoing but equally applies to drive pulses having gradually varying leading edges and steep trailing edges or both steep leading and trailing edges. It is often found that appliances provided with an electric motor thus energized are subject to substantial mechanical vibrations which have an adverse effect on the lifetime of the appliance and moreover produce a high level of noise, which is obviously an undesirable characteristic.

It is an object of the invention to provide a device which provides a drastic reduction in the vibration and noise level. To this end the device according to the invention is characterized in that the drive varies substantially stepwise during at least one edge of each drive pulse, the signal varying substantially stepwise from a first level to a second level around a first instant and the signal varying substantially stepwise to a third level around a second instant. The second level is situated between the first and the third level, and the time interval between the first and the second instant is selected so that the response to a mechanical resonance vibration which may be produced by the motor drive can be reduced.

The invention is based on the recognition that the noise which is produced is caused by the acoustic radiation of mechanical vibrations of structures, which mechanical vibrations are excited by the steep edges of the drive pulses of the motor-drive signal. Especially if a structure is excited into mechanical resonance, the vibration amplitudes are then very large so that a very high noise level is produced. Especially in the case of steep edges in the drive pulses, which edges represent a broad frequency spectrum, the likelihood of one or more mechanical resonance vibrations being excited is very great. By means of the device in accordance with the invention the response of at least one of said resonance vibrations can be reduced.

As a result of the drive signal, which varies stepwise from the first level to the second level at the first instant, a mechanical resonance vibration will be excited. If, at the second instant, the drive signal changes stepwise to the third level, with the time interval between the first and the second instant corresponding to half the period of the mechanical resonance vibration, a second damped resonance vibration of the same frequency but opposite phase is excited. By a suitable choice of the ratio of the drive steps the two excited resonance vibrations will substantially cancel each other after the second instant. This results both in a substantial reduction of the vibration level and a substantial reduction of the noise level which is produced.

A preferred version of the device in accordance with the invention, in which each drive pulse has a steep leading edge, is characterized in that the drive varies substantially stepwise during at least a trailing edge of each drive pulse, while around a third instant the signal varies substantially stepwise from a fourth level to a fifth level and around a fourth instant the signal varies substantially stepwise to a sixth level, the fifth level being situated between the fourth and the sixth level. The advantage of this is that the second and the fifth level can be selected to be unequal, which in practice is often desirable if the invention is applied to pulses having both a steep leading and a steep trailing edge.

A further preferred version of the invention is characterized in that the time interval between the third and the fourth instant is at least substantially equal to said time interval between the first and the second instant. The two preferred embodiments of the device in accordance with the invention convert both the leading and the trailing edges into stepped curves so that the excitation of resonance vibrations as a result of the two edges is reduced.

A first embodiment of the device in accordance with the invention, in which the drive pulse at least has a steep leading edge, is characterized in that the device is equipped with first switching means, second switching means and an output, the first switching means being switched at the first instant so that the signal at the output changes from the first level to the second level, and the second switching means being switched at the second instant so that the signal at the output changes to the third level.

This embodiment may further be characterized in that the second switching means comprise a parallel connection of a resistor and a switch, the switch being open before the second instant and the switch being closed at the second instant so that the resistor is short-circuited. In this way the desired result can be obtained by means of a simple circuit arrangement. By switching on the first switching means a voltage is produced across the resistor and an electric motor connected to the output of the device. A part of this voltage appears across the motor and provides the first drive step. The rest of the supply voltage appears across the resistor. Short-circuiting the resistor provides the second drive step.

A second embodiment of the device in accordance with the invention, in which the drive pulse has at least a steep trailing edge, is characterized in that the device is equipped with first switching means, second switching means and an output, the second switching means being switched at the first instant so that the signal on the output changes from the first level to the second level, and the first switching means being switched at the second instant so that the signal on the output changes to the third level. This embodiment may further be characterized in that the second switching means comprise a parallel connection of a resistor and a switch, the switch being in the closed position before the first instant so that the resistor is short-circuited, and the switch being opened at the first instant.

In this way the desired effect can be obtained by means of a very simple circuit arrangement. Since the circuit arrangement is moreover identical to that of the preferred version of said first embodiment, this provides a circuit arrangement which can be used both for processing pulses with a leading edge and for pulses solely having a trailing edge. By opening the switch a part of the voltage which appeared across the motor prior to opening becomes available across the resistor, so that a drive step for the motor is obtained from the first to the second level. By switching off the first switching means the second drive step is obtained.

In a further preferred version of both the first and the second embodiment of the device in accordance with the invention, a series connection of a second resistor and a capacitor is connected in parallel with the resistor. The time interval between the first and the second instant is determined by the time-constant of said second resistor and the capacitor.

A possible embodiment of the device in accordance with the invention for converting a steep leading edge is characterized in that the first switching means comprise a thyristor, that the first switching means is connected in series with the second switching means, that the second switching means comprise a parallel connection of a resistor and a second thyristor, that in parallel therewith there is included a series connection of a second resistor and a capacitor and, also in parallel therewith, a series connection of a third resistor and a fourth resistor. The second, third and fourth resistors in conjunction with the capacitor constitute a bridge circuit, the junctions between the second resistor and the capacitor and between the third and the fourth resistor each being interconnected to an input of a tetrode thyristor having an output connected to the control input of the second thyristor. This embodiment has the advantage that the device can be used directly for driving electric motors, as for example in washing machines, instead of the known device of the aforementioned patent.

A preferred version of the last-mentioned embodiment of the device in accordance with the invention is characterized in that a voltage-stabilizing element is included in parallel with the series connection of the second resistor and the capacitor.

In a further preferred version a zener diode may be used as the voltage stabilizing element. This yields the advantage that the time interval between the first and the second instant is fixed, that is independent of the load of the electric motor.

A third embodiment of the device in accordance with the invention, in which the drive pulse has both a steep leading and trailing edge, is characterized in that the device is equipped with first, second and third switching means and an output, the first switching means being switched on at the first instant so that the signal at the output changes from the first level to the second level, and the second switching means being switched at the second instant so that the signal at the output changes to the third level. The third switching means is switched at the third instant so that the signal at the output changes from the fourth level to the fifth level, and the first switching means being switched off at the fourth instant so that the signal at the output changes to the sixth level.

In this way the intermediate levels can be obtained by means of a simple circuit arrangement. Assuming that the supply voltage is a direct voltage, the third and the fourth levels will be equal to each other as well as the first and the sixth levels. However, the intermediate levels, that is the second and the fifth levels, are not equal, because the ratio of the difference of the second and the first levels to the difference of the third and the second levels should be equal to the ratio of the difference of the fourth and the fifth levels to the difference of the fifth and the sixth levels. Since the differences of the second and the first and of the third and the second levels are generally not equal, the second and the fifth levels also will not be equal.

A preferred version of the third embodiment of the device in accordance with the invention is characterized in that the second switching means are constituted by a parallel connection of a first resistor and a first switch, the third switching means are constituted by a parallel connection of a second resistor and a second switch, that before the first instant the first switch is open and the second switch is closed, that at the second instant the first switch is closed and that at the third instant the second switch is opened.

A further preferred version of the device in accordance with the invention, in which the second switching means comprise a parallel connection of a first resistor and a second switch, is characterized in that the device is connected to an electric motor for driving a washing machine, an additional resistor being included in series with the electric motor, which additional resistor serves as a heating element for the washing machine.

This preferred version has the advantage that it is independent of the speed and the load of the electric motor. This means that, independent of the speed or the load of the electric motor during washing, that is with the additional resistor for heating the washing water switched in, the ratio of the difference of the second and the first level and the difference of the third and the second level remains substantially constant because this ratio is mainly determined by the ratio of the resistance of the additional resistor to that of the first resistor.

A fourth embodiment of the device in accordance with the invention is characterized in that, in order to reduce the response to any mechanical resonance vibration of higher frequency which may be produced, each step of each drive signal, which already varies stepwise, is again varied substantially stepwise.

After the most important resonance vibration has been reduced by means of one of the said embodiments of the device in accordance with the invention, the noise level may still be too high. This may be caused by the presence of, for example, a second resonance vibration of higher frequency and a lower response amplitude.

For reducing said resonance vibration the same method as described in the foregoing may be applied to each edge.

A further embodiment of the device in accordance with the invention is characterized in that it is coupled to a motor in order to drive said motor, the time interval between the instants being selected so that the response of at least one mechanical resonance vibration of the motor, which may be produced by the motor drive, can be reduced. In this way mechanical resonance vibrations of the motor housing can be reduced.

A further embodiment of the device in accordance with the invention is characterized in that it is coupled to a motor in order to drive said motor, the device and the motor being incorporated in an appliance and the time interval between the instants being selected so as to reduce the response to at least one mechanical resonance vibration of the appliance which may be produced by the motor drive. Via the fixing points of the motor to the appliance to be driven, excitation forces may be transmitted to the appliance so that resonance vibrations may be excited in the appliance. By adapting the time interval between the instants to half the period of such a resonance vibration, the amplitude of said vibration can be reduced.

Particular embodiments of the invention will be described in more detail with reference to the accompanying drawings in which:

FIG. 11b illustrates the inventive principle applied to a pulse-shaped drive in accordance with FIG. 11a.

FIG. 1 represents the known device 1 for driving the motor 2. The device comprises a thyristor 3 which is turned on by applying a trigger pulse to its control input 4.

The supply voltage V in the form of an alternating voltage is applied to the device via terminals 5—5'. By applying the trigger pulse to the gate 4 of the thyristor 3 at a specific instant during the positive half-cycle of the supply voltage, said thyristor is turned on so that the drive signal for the motor rapidly assumes the instantaneous value of the supply voltage.

Figure 2:
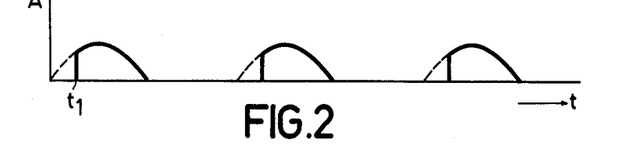
FIG. 2 represents the drive signal as a function of time, which signal is applied by the known device to an electric motor to be connected thereto.

FIG. 2 represents the amplitude A of the drive signal, obtained with the known device of FIG. 1, as a function of time, which drive signal exhibits steep edges at the time instant $t_1$ and at instants appearing at integral multiple of the period of the supply voltage later.

Appliances, such as for example washing machines, which are provided with an electric motor thus driven frequently appear to be subject to subtantial vibrations and to produce a high noise level.

Figure 3:
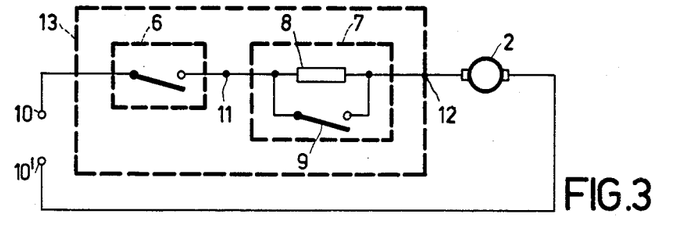
FIG. 3 shows a first embodiment of the device in accordance with the invention comprising first and second switching means.

FIG. 3 shows a first embodiment 13 of the device in accordance with the invention.

Figure 4:
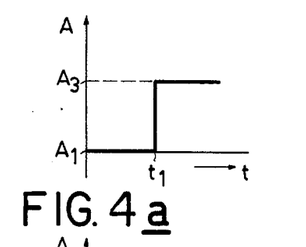
FIGS. 4b and 4d, represent the output signals of the second switching means of FIG. 3 as a function of time in response to the output signals of the first switching means of FIG. 3 and shown in FIGS. 4a and 4c respectively.

The device is equipped with a first switching means 6 and a second switching means 7. The first switching means may be constituted by a switch 6 and the second switching means may be constituted by a parallel connection of a resistor 8 and a switch 9. The supply voltage is applied to the terminals 10—10', which voltage need not necessarily be an alternating voltage, but may equally be a direct voltage. If the supply voltage is an alternating voltage the switches 6 and 9 may be constituted by thyristors. FIG. 4a represents the signal at the output 11 of the first switching means 6 as a function of time and FIG. 4b the corresponding signal at the output 12 of the second switching means 7.

Before the time instant $t_1$ the two switches 6 and 9 are open. At the time instant $t_1$ switch 6 is closed. The signal at the output 11 assumes the amplitude value $A_3$ and the signal at the output 12 the amplitude value $A_2$ because a part of the supply voltage appears across the resistor 8. At the time instant $t_2$ the switch 9 is closed so that the signal at the output 12 assumes the amplitude value $A_3$.

In this case it is assumed that the supply voltage applied to the terminals 10—10' is a direct voltage. If an alternating voltage is used as the supply voltage, the amplitudes $A_2$ and $A_3$ of FIGS. 4a and 4b will not be constant, but will exhibit slow variations corresponding to the variations of the supply voltage. However, this does not basically affect the concept of the invention or the embodiment of the device as shown in FIG. 3.

Alternatively, the device of FIG. 3 may convert a falling edge as shown in FIG. 4c into a stepwise waveform as shown in FIG. 4d. For this purpose the two switches 6 and 9 are closed before the time instant $t_1$. At the instant $t_1$ switch 9 is opened so that the signal at the output 12 decreases to an amplitude $A_2$. At the time instant $t_2$ switch 6 is opened so that the signals on each of the outputs 11 and 12 assume the amplitude value $A_1$. The operation of the device in accordance with the invention is based on the following considerations.

The noise which is produced is caused by acoustic radiation of mechanical vibrations of structures, which mechanical vibrations are excited especially by the steep edges in the drive signal. In accordance with the invention this noise can be reduced, the means by which this takes place being explained with reference to FIGS. 5 and 6.

Figure 5:
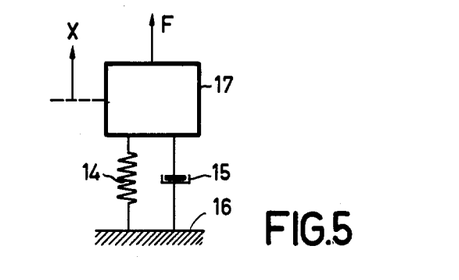
FIG. 5 represents a damped mass-spring system by means of which the principle on which the invention is based will be explained.
Figure 6A:
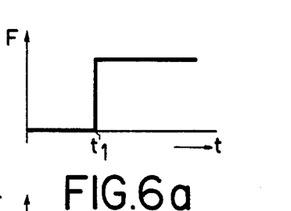
FIG. 6 represents four timing signals, FIG. 6b representing the response of the mass-spring system of FIG. 5 to an excitation as shown in FIG. 6a and FIG. 6d representing the response of the mass-spring system to an excitation as shown in FIG. 6b.
Figure 6B:
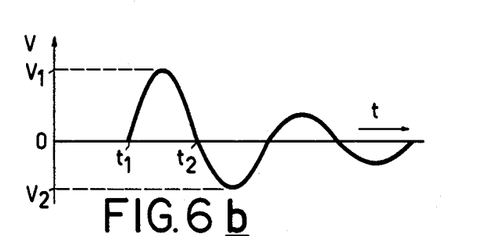

FIG. 5 represents a damped mass-spring system. The mass 17 is connected to base 16 via a spring 14 and a dashpot 15. A force F exerted on the mass 17 causes the mass to move. FIG. 6b represents the velocity V of the mass 17 as a function of time in response to a stepwise force as represented in FIG. 6a. Owing to the stepwise force the mass-spring system produces a resonance vibration, which decays rapidly or not depending on the damping coefficient of the dashpot 15. More complex structures, such as a motor incorporated in an appliance, exhibit a corresponding behaviour with a multiplicity of resonance vibrations. In the case of a stepwise excitation, in principle, a large number of resonance vibrations of the structure will be excited, one of them being predominant and having the largest amplitude response.

The contribution to the overall noise level which is made by this predominant vibration will generally be greatest. There is a close relationship between the method of excitation and the response of the excited vibrations.

Figures 6C, 6D:
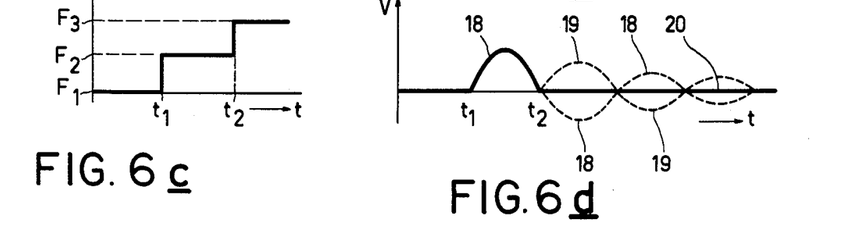

By means of a different excitation as a function of time the response of the excited vibrations and the associated noise level can now be reduced. FIGS. 6c and 6d illustrate the idea on which the invention is based, as applied to the damped mass-spring system of FIG. 5. The excited vibration can be reduced substantially by converting the stepwise excitation of FIG. 6a into a stepwise excitation as represented in FIG. 6c, the force increasing stepwise to the level of force $F_2$ at the instant $t_1$ and to the final level $F_3$ at the instant $t_2$ with the time interval between the two instants corresponding to half the period of the resonance vibration of the mass-spring system, that is to the interval between the time instants $t_1$ and $t_2$ of FIG. 6b.

In FIG. 6d the reference numeral 18 designates the response of the mass-spring system of FIG. 5 to the stepwise excitation from the level of force $F_1$ to that of force $F_2$ at the instant $t_1$ as a function of time. The solid line represents the response for the interval between time instants $t_1$ and $t_2$ and the dashed line for the instants after time instant $t_2$. The response 19 of the mass-spring system to the stepwise excitation from the level of force $F_2$ to that of force $F_3$ at the instant $t_2$ as a function of time is depicted by the second solid line for the instants after time instant $t_2$. For the instants after time instant $t_2$ the two responses 18 and 19 are found to be opposite in phase to each other. In the case of a suitable choice of the ratio of the force $F_2-F_1$ and the force $F_3-F_2$, that is equal to the ratio $V_1$ and $V_2$ of FIG. 6b, $V_1$ and $V_2$ respectively representing the maximum amplitude of the first and the second half vibration period, the two velocities (vibrations) will exactly cancel each other. The resulting response of the mass-spring system of FIG. 5 to the excitation of FIG. 6c is represented in FIG. 6d by the solid line 18 for the interval between time instants $t_1$ and $t_2$ and by the solid line 20 for the instants after the time instant $t_2$. Relative to the response of FIG. 6b it is substantially reduced.

Figure 7:
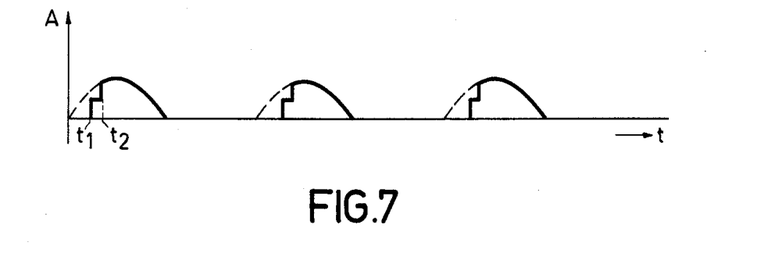
FIG. 7 represents the drive signal as a function of time of FIG. 2, the concept of the invention being applied to the pulse edges.

FIG. 7 schematically represents the drive signal which would be obtained if the inventive principle was applied to the signal of FIG. 2 associated with the known device, in which in comparison with FIG. 2 the steep leading edges are replaced by stepped edges in accordance with FIG. 6c.

Figure 8:
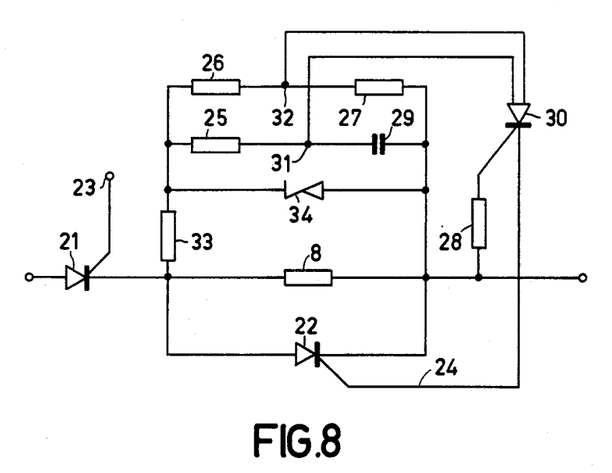
FIG. 8 represents a preferred embodiment of the device in accordance with the invention.

FIG. 8 represents a preferred embodiment of the device 13 of FIG. 3, which may be used instead of the known device 1 of FIG. 1 in order to generate the drive signal represented in FIG. 7. The first switching means is constituted by the thyristor 21. The second switching means is constituted by a resistor 8 and a thyristor 22. The thyristor 22 correspond to the switch 9 of FIG. 3. In parallel with resistor 8 there is included a series connection of a resistor 33 and a voltage stabilizing element, for example a zener diode 34. Moreover, a series connection of a resistor 25 and a capacitor 29 is connected in parallel with the zener diode 34. Furthermore, two series-connected resistors 26 and 27 are connected in parallel with the zener diode 34. The junction points 31 and 32 between the elements in the two parallel branches are connected to the inputs of a tetrode thyristor 30. The output of the tetrode thyristor 30 is connected to the gate 24 of the thyristor 22. Before the time instant $t_1$ the thyristor 21 is turned off. The capacitor 29 is consequently in the discharged condition. At time instant $t_1$ the thyristor 21 receives a control pulse via its trigger input 23 so that it is turned on. The capacitor 29 is then charged so that the voltage at point 31 slowly increases to the value of the voltage across zener diode 34. The time constant of the series connection of resistor 25 and capacitor 29 determines the time instant $t_2$ at which the voltages at the points 31 and 32 become equal to each other. At this instant the tetrode thyristor 30 is turned on so that a trigger pulse is applied to the gate 24 of thyristor 22 and said thyristor is turned on and the resistor 8 is consequently short-circuited. The value of the resistor 8 together with the impedance of the electric motor determines the value of the intermediate amplitude level $A_2$. At a specific value of the resistor 8 a maximum reduction of the response of the predominant resonance vibration will be obtained. This circuit arrangement has the advantage that, because time instant $t_2$ is determined by the constant voltage across the zener diode 34, the time interval $t_2-t_1$ becomes independent of the load. Moreover, the circuit, starting from the trigger pulse to be applied to the first switching means, automatically provides the control pulse for switching the second switching means.

Figure 9:
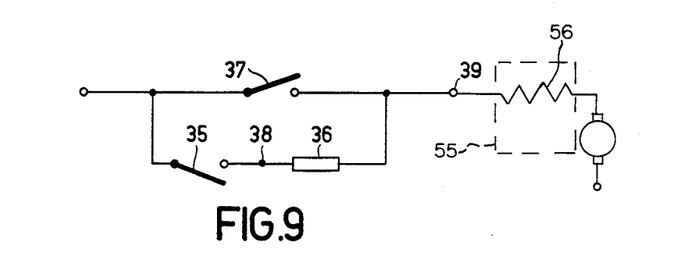
FIG. 9 represents a second embodiment of the device in accordance with the invention.

FIG. 9 represents a second embodiment of the device which may be used instead of the device 13 of FIG. 3. The first switching means is now constituted by a switch 35 and the second switching means is constituted by a resistor 36 and a switch 37, the switch 37 being connected in parallel with the series connection of the switch 35 and the resistor 36. The operation of the device is identical to that of the device 13 of FIG. 3, the switch 35 corresponding to the switch 6 of FIG. 3 and the switch 37 corresponding to the switch 9 of FIG. 3. The signals on junctions 38 and 39 respectively correspond to those on junctions 11 and 12 of FIG. 3 and are represented in FIGS. 4a and 4c for the signal on point 38 and FIGS. 4b and 4d for the signal on point 39. The said devices of FIGS. 3, 8 and 9 have an additional advantage if they are used for driving an electric motor of a washing machine, illustrated schematically in FIG. 9 by the dashed box 55. In a washing machine an additional resistor 56 serving as a water heating element is frequently connected in a series with the motor. As the resistance of said additional resistor is generally substantially higher than the impedance of the electric motor, the ratio of amplitude levels $A_3-A_2$ as compared to amplitude levels $A_2-A_1$ is mainly determined by the ratio of the resistance of the resistor 8 (the resistor 36 in FIG. 9) to that of the additional resistor. This means that these devices always maintain the intermediate level at the correct position (in the correct ratio) between the first and the third level, independently of the speed and the load.

Figure 10:
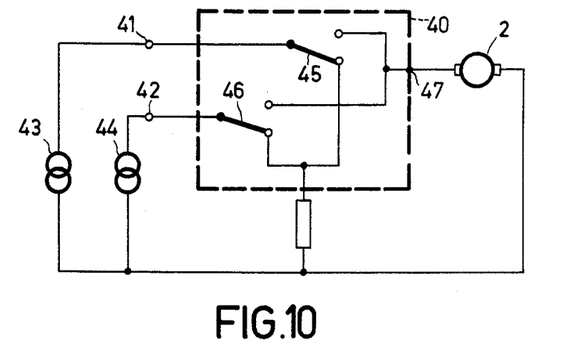
FIG. 10 represents a third embodiment of the device in accordance with the invention.

FIG. 10 represents a third embodiment of the device in accordance with the invention which uses current drive instead of voltage drive for the motor 2. The device 40 comprises two inputs 41 and 42 to which two current sources 43 and 44 may be connected. Via first switching means 45, for example comprising a switch, input 41 may be connected to the output 47 of the device. Via second switching means 46, for example constituted by a switch, input 42 may also be connected to the output 47. The two switches 45 and 46 are represented in the open position in FIG. 10. By closing the one switch 45 at the time instant $t_1$ and closing the other switch 46 at the time instant $t_2$ the signal wave form represented in FIG. 4b will be obtained at the output 47 of the device. The decreasing stepwise waveform of FIG. 4d can also be obtained by means of the device of FIG. 10. For this purpose the two switches are closed before the time instant $t_1$. At the instant $t_1$ the switch 46 is opened and at the time instant $t_2$ the switch 45 is opened.

Figure 11:
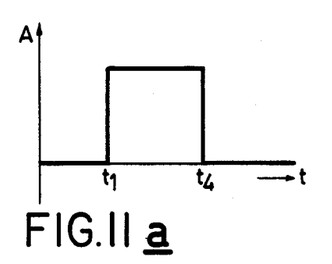

The embodiments of the device in accordance with the invention discussed so far, except for that of FIG. 10, cannot be used for converting drive signals having both steeply rising edges and steeply falling edges, as is for example shown in FIG. 11a. The idea of the invention as illustrated in FIG. 6 when applied to the signal of FIG. 11a yields a signal as shown in FIG. 11b, the intermediate amplitude levels $A_2$ and $A_5$ generally not having the same value. Suitably, the ratio of amplitude levels $A_2$-$A_1$ and $A_3$-$A_2$ should be approximately equal to the ratio of amplitude levels $A_3$-$A_5$ and $A_5$-$A_1$. If a signal which varies in time is used as the power supply for the device, it is to be noted that the levels in FIG. 11 may vary in time. It will then be apparent that the amplitude level $A_3$ at the time instant $t_3$ will have a different value, for example, an amplitude level $A_4$ (not shown) than at the time instant $t_2$, and the amplitude level $A_1$ at the time instant $t_4$ will also have a different value, for example, an amplitude level $A_6$ (not shown). The ratio of amplitude levels $A_2$-$A_1$ and $A_3$-$A_2$ is then suitably equal to the ratio of the amplitude levels $A_4$-$A_5$ and $A_5$-$A_6$.

Figure 12:
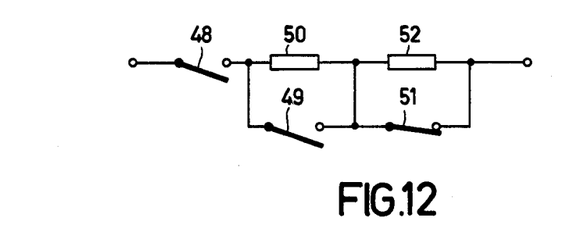
FIG. 12 represents a fourth embodiment of the device in accordance with the invention for obtaining the pulse-shaped drive in accordance with FIG. 11b.

As stated in the foregoing the device of FIG. 10 can be used for converting the signal of FIG. 11a. For this purpose the two switches 45 and 46 should be open before the time instant $t_1$. At the time instant $t_1$ switch 45 is for example closed and at the time instant $t_2$ switch 46 is closed. At the time instant $t_3$ switch 45 is opened first and at time instant $t_4$ switch 46 is opened so that different intermediate levels are obtained at the front and back edges of the pulse. A further embodiment of the device in accordance with the invention, which may also be used for converting the signal of FIG. 11a into the signal of FIG. 11b, is shown in FIG. 12 and may be used instead of the device 13 of FIG. 3. The device comprises first switching means, for example a switch 48, second switching means comprising a parallel connection of a switch 49 and a resistor 50, and third switching means comprising a parallel connection of a switch 51 and a resistor 52. Before the time instant $t_1$ switch 48 and one of the switches 49 or 51, for example switch 49, are open. The other switch 51 is then closed. At time instant $t_1$ switch 48 is closed by switch control device 53 and at instant $t_2$ switch 49 is closed. At time instant $t_3$ switch 51 is now opened and at instant $t_4$ switch 48 is opened.

Figure 13:
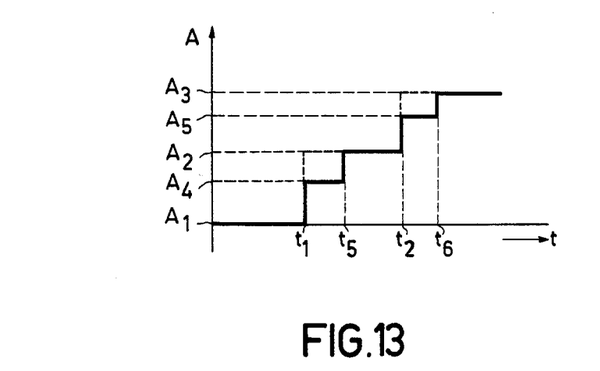
FIG. 13 illustrates the effect of applying the inventive principle twice to a drive pulse which already varies stepwise.

After using the principle of the invention for reducing the response to the predominant resonance vibration, it may be necessary to apply the principle once again to the already stepwise waveform of FIG. 4b in order to reduce the response to another resonance vibration which is now predominant, generally of a higher frequency. The result of this is represented in FIG. 13 where each step at the time instant $t_1$ or $t_2$ in the stepped waveform is again converted into a stepwise varying waveform by the introduction of an intermediate amplitude level $A_4$ and $A_5$ respectively, the ratio between amplitude levels $A_4$-$A_1$ and $A_2$-$A_4$ being preferably equal to the ratio between amplitude levels $A_5$-$A_2$ and $A_3$-$A_5$.

What is claimed is:

1. A pulse-drive device for an electric motor in which at least one edge of a drive pulse varies substantially stepwise, said device comprising, a pair of input terminals for connection to a source of supply voltage, means coupled between the input terminals and the motor for deriving drive signal pulses that vary substantially stepwise from a first level to a second level around a first time instant and that vary substantially stepwise to a third level around a second time instant, said second level being intermediate in value between the first and the third level, and means for setting the time interval between the first and the second time instants to a value so as to reduce a mechanical resonance vibration which may be produced by the motor drive.

2. A device as claimed in claim 1, characterized in that the edge is a leading edge.

3. A device as claimed in claim 2, wherein said drive signal deriving means comprises first switching means, second switching means and an output coupled to the motor, the first switching means being switched at the first time instant so that the signal at the output changes from the first level to the second level, and the second switching means being switched at the second instant so that the signal at the output changes to the third level.

4. A device as claimed in claim 3, wherein the second switching means comprise a parallel connection of a resistor and a switch, the switch being open before the seond time instant and the switch being closed at the second time instant so that the resistor is short-circuited.

5. A device as claimed in claim 4 further comprising a series connection of a second resistor and a capacitor connected in parallel with the first resistor and having a time constant that determines the time interval between the first and the second time instant.

6. A device as claimed in claim 4, wherein the first switching means comprise a thyristor connected in series with the second switching means, the second switching means including a parallel connection of a resistor and a second thyristor, a series connection of a second resistor and a capacitor connected in parallel with the second switching means, a series connection of a third resistor and a fourth resistor connected in parallel with the second switching means, said second, third and fourth resistors comprising a bridge circuit with the capacitor, means connecting the junctions between the second resistor and the capacitor and between the third and the fourth resistor each to an input of a tetrode thyristor having an output terminal connected to a gate of the second thyristor.

7. A device as claimed in claim 6 further comprising a voltage-stabilizing element connected in parallel with the series connection of the second resistor and the capacitor.

8. A device as claimed in claim 7 wherein the voltage-stabilizing element comprises a zener diode.

9. A device as claimed in claims 4, 6, 7, or 8, characterized in that the device is connected to an electric motor adapted to drive a washing machine, and a resistor connected in series with the electric motor and adapted to serve as a heating element for the washing machine.

10. A device as claimed in any one of claims 1, 3, or 4 wherein, in order to reduce the response to any mechanical resonance vibration of higher frequency which may be produced, said drive signal deriving means includes means for further varying each step of each drive signal pulse, which already varies stepwise, in a substantially stepwise manner.

11. A device as claimed in any one of claims 2, 3 or 4, characterized in that it is coupled to a motor in order to drive said motor, the time interval between the time instants being selected so as to reduce the response to at least one mechanical resonance vibration of the motor which may be produced by the motor drive.

12. A switching control circuit for an electric motor having a start-up phase and a subsequent running state comprising, a pair of input terminals for connection to a source of voltage, an output terminal for connection to the motor, and a control device coupling at least one input terminal to the output terminal and comprising, first and second controlled switching devices for selectively coupling at least said one input terminal to the output terminal to produce a drive signal for the motor during the motor running state having a waveform with at least one edge that varies stepwise from a first level to a second level at a first instant of time and varies stepwise to a third level at a second instant of time with said second level being intermediate in value said first and third levels, and means for controlling the operation of said first and second switching devices so that the time interval between the first and second time instants is approximately equal to half a period of a mechanical resonance vibration which otherwise would be produced in the motor drive if said drive signal varied stepwise from the first to the third level.

13. A switching control circuit as claimed in claim 12 wherein said first switching device comprises a first controlled semiconductor device, the second switching device comprises a second controlled semiconductor device in parallel with an impedance element, and said controlling means applies trigger signals to control electrodes of said first and second semiconductor devices at said first and second time instants, respectively, whereby said first and second semiconductor devices switch conductive states to vary the drive signal at the output terminal from the first level to the second level at the first time instant and from the second level to the third level at the second time instant.

14. A switching control circuit as claimed in claim 13 wherein said first and second switching devices are connected in series between said one input terminal and the output terminal, said first and second semiconductor devices being cut-off prior to said first time instant, and said first and second semiconductor devices being triggered into conduction at said first and second time instants, respectively.

15. A switching control circuit as claimed in claims 13 or 14 wherein said controlling means includes an RC timing circuit energized from said input terminals via the first semiconductor device and having an output coupled to the control electrode of the second semiconductor device to apply a trigger signal thereto at the second time instant, and RC timing circuit determining said time interval between the first and second time instants.

16. A pulsed drive device for an electric motor having a start-up phase and a subsequent running state comprising, a pair of input terminals for connection to a source of supply voltage, means coupled between the input terminals and the motor for deriving a drive signal during the running state of the motor, said drive signal comprising a sequence of pulses at least some of which have at least one edge that varies substantially stepwise from a first level to a second level at a first time instant and that varies substantially stepwise to a third level at a second time instant, said second level being intermediate in value between the first and third level, and means for setting the time interval between the first and the second time instants to a value so as to compensate at least one mechanical resonance vibration produced by the motor drive.

17. A method of driving an electric motor having a start-up phase and a subsequent running state wherein a switching device is coupled between a source of supply voltage and an input terminal of the motor, the method comprising: operating said switching device during the running state of the motor so as to apply a drive signal to the motor input terminal having a waveform with a leading edge that varies stepwise from a first level to a second level at a first instant of time, and then operating the switching device to vary the leading edge of the waveform from the second level to a third level at a second instant of time and with said second level being intermediate in amplitude said first and third levels, the time interval between the first and second time instants being approximately equal to half a period of mechanical resonance vibration of the motor drive otherwise produced by a stepwise variation of the drive signal waveform.

18. A method as claimed in claim 17 comprising the further steps of operating the switching device during the running state of the motor so as to vary a trailing edge of the drive signal waveform stepwise from a fourth level to a fifth level at a third instant of time, and then operating the switching device to vary the trailing edge of the drive signal waveform from the fifth level to a sixth level at a fourth instant of time and with said fifth level being intermediate in amplitude the fourth and sixth levels, the time interval between the third and fourth instants of time being determined by a mechanical resonance vibration of the motor drive.

* * * * *